United States Patent [19]

Muller

[11] Patent Number: 4,648,553

[45] Date of Patent: Mar. 10, 1987

[54] REGULATING VALVE

[75] Inventor: John T. Muller, Morris Plains, N.J.

[73] Assignee: Leslie Company, Parsippany, N.J.

[21] Appl. No.: 753,189

[22] Filed: Jul. 9, 1985

[51] Int. Cl.⁴ .......................................... G05D 23/00
[52] U.S. Cl. ................................. 236/80 R; 137/488;
236/DIG. 2
[58] Field of Search ............ 236/DIG. 2, 80 R, 92 R,
236/92 A; 137/488

[56] References Cited

U.S. PATENT DOCUMENTS

| | | | |
|---|---|---|---|
| 2,029,203 | 7/1932 | Soderberg | 236/92 |
| 2,387,792 | 10/1945 | Holmes | 236/DIG. 2 |
| 3,366,140 | 1/1968 | Dunn | 236/92 A X |
| 4,469,275 | 9/1984 | De Salve | 236/DIG. 2 |
| 4,537,346 | 8/1985 | Duprey | 236/DIG. 2 |

Primary Examiner—William E. Wayner
Attorney, Agent, or Firm—Lerner, David, Littenberg, Krumholz & Mentlik

[57] ABSTRACT

A regulating valve having a fail-safe action which is suitable for controlling the flow of either a heating or cooling medium in response to a sensed condition is disclosed. The flow of heating or cooling medium is responsive to changes in temperature at a selected location, which changes are sensed by thermal element. The fail-safe action of the regulating valve either permits or prevents flow of the heating or cooling medium upon failure of the thermal element.

25 Claims, 2 Drawing Figures

REGULATING VALVE

BACKGROUND OF THE INVENTION

The present invention relates in general to a regulating valve suitable for controlling the flow of a fluid in response to a sensed condition, and more particularly, to such a regulating valve suitable for controlling the flow of a heating or cooling medium in response to changes in temperature at a selected location, which temperature changes are sensed by a thermal element, and designed to either permit or prevent flow of the heating or cooling medium upon failure of the thermal element.

Regulating valves are commonly used for controlling the flow of a heating or cooling medium internally within a surrounding jacket of, for example, engines, compressors, heat transfer equipment and the like. The temperature of the heating or cooling medium in the jacket is sensed by a thermal element. These thermal elements are typically of the expansion type incorporating liquid, vapor, gas, wax or bi-metallic members to produce the necessary force and movement. In heating operations, the flow of the heating medium is increased when the sensed temperature drops and reduced when the sensed temperature increases. On the other hand, in cooling operations, the flow of the cooling medium is reduced when the sensed temperature drops and increased when the sensed temperature increases.

In a typical situation where cooling water or brine is supplied to the jacket of an internal combustion engine or a compressor, the fluid in the thermal element expands and elongates a bellows assembly in response to an increase in the temperature of the cooling water or brine flowing through the jacket. The elongated bellows is operative to extend a shaft to move a pilot mechanism in a preferred direction to cause the regulating valve to open and increase the flow of cooling water or brine to the jacket. On the other hand, a drop in temperature of the cooling water or brine causes the collapse of the bellows assembly and the retraction of the shaft. This results in the pilot mechanism moving in another preferred direction to cause the regulating valve to close, to a varied degree, thereby reducing the flow of the cooling water or brine until the temperature of same within the jacket to the engine returns to within the desired range.

In the foregoing situation, failure of the thermal element corresponds to the thermal element sensing an extremely low temperature which results in the collapse of the bellows assembly and the retraction of the shaft. This results in the pilot mechanism moving to a position which closes off the flow of the cooling water or brine to the jacket, despite the fact that the temperature of the cooling water or brine within the jacket may be excessively high. As a consequence, there is a serious potential to cause irreparable damage to the engine. This problem is also present when using a heating medium such as oil or steam in heat transfer equipment such as reaction vessels and the like. The failure of the thermal element will accordingly correspond to the sensing of a very low temperature which, in turn, causes the pilot mechanism to move to a position to open the flow of hot oil or steam to the jacket of the reactor vessel. As a consequence, the chemical reaction may be adversely effected with potentially dangerous consequences.

In order to overcome the foregoing problem resulting from the failure of the thermal element, complex circuits and auxiliary controls have been devised to provide what has been commonly referred to as a failsafe type action. In addition, thermal elements have been constructed by being filled under vacuum so that their filled normal working length is shorter than their relaxed or unfilled length. Although these alternative designs perform the desired function, they are often complex and expensive, limited in application range, less reliable than the standard known thermal elements, more vulnerable to hostile conditions, and often not readily available as stocked items.

SUMMARY OF THE INVENTION

It is broadly an object of the present invention to provide a regulating valve which overcomes or avoids one or more of the foregoing disadvantages resulting from the use of the above-mentioned prior art regulating valves and the associated failure of their thermal elements, and which fulfills the requirements of such a regulating valve for controlling the flow of a heating or cooling medium under conditions which provide a failsafe type action.

Specifically, it is within the contemplation of one aspect of the present invention to provide a regulating valve which, upon failure of the thermal elements, opens when supplying a cooling medium and closes when supplying a heating medium.

Another object of the present invention is to provide a regulating valve which is inexpensive to manufacture, is operative over a wide range of applications, reliable in use, and not susceptible to being damaged or broken under adverse operating conditions.

Another object of the present invention is to provide a regulating valve which employs a standard thermal element adapted for either heating or cooling applications.

In accordance with the present invention there is provided a valve for controlling the flow of a fluid in response to a sensed condition. The valve is constructed from a body having a body inlet and a body outlet through which a fluid to be regulated flows, regulating means within the body for regulating the flow of the fluid between a first and a second state, sensing means for sensing a condition to be controlled by regulating the flow of the fluid between the states, control means for controlling the regulating means in response to the sensing means, and adjusting means for adjusting the control means such that the fluid is maintained by the regulating means at one of the states upon the sensing means becoming inoperative.

In accordance with another embodiment of the present invention, the valve is constructed from a body having a body inlet and a body outlet through which a fluid to be regulated flows, regulating means within the body for regulating the flow of the fluid between a first state permitting the flow of at least a portion of the fluid through the body and a second state preventing the flow of the fluid through the body, sensing means for sensing a condition to be controlled by regulating the flow of the fluid between the states, a chamber in fluid communication with the body inlet and the body outlet, a diaphragm for controlling the regulating means in response to the sensing means, the diaphragm having an upper and lower portion each in fluid communication with the chamber for receiving the fluid from the body inlet, the lower portion in further fluid communication with the body outlet, the diaphragm connected to the regulating means for controlling the flow of the fluid through the body in response to the movement of the diaphragm caused by the pressure differential of the fluid within the upper and lower portions, and a lever within the chamber including a channel extending therethrough and having a lever inlet and a lever outlet, the lever inlet closed by a portion of the sensing means when the sensing means is operative and opened when the sensing means is inoperative, the lever inlet in fluid communication with the body inlet and the lower outlet in fluid communication with at least the body outlet when the lever inlet is opened, the lever adjusting the control means such that the fluid is maintained by the regulating means at one of the states upon the opening of the lever inlet.

BRIEF DESCRIPTION OF THE DRAWINGS

The above description, as well as other objects, features and advantages of the present invention will be more fully understood by reference to the following detailed description of the presently preferred, but nonetheless illustrative, regulating valve in accordance with the present invention, when taken in conjunction with the accompanyng drawings, wherein.

DETAILED DESCRIPTION

Figure 1:
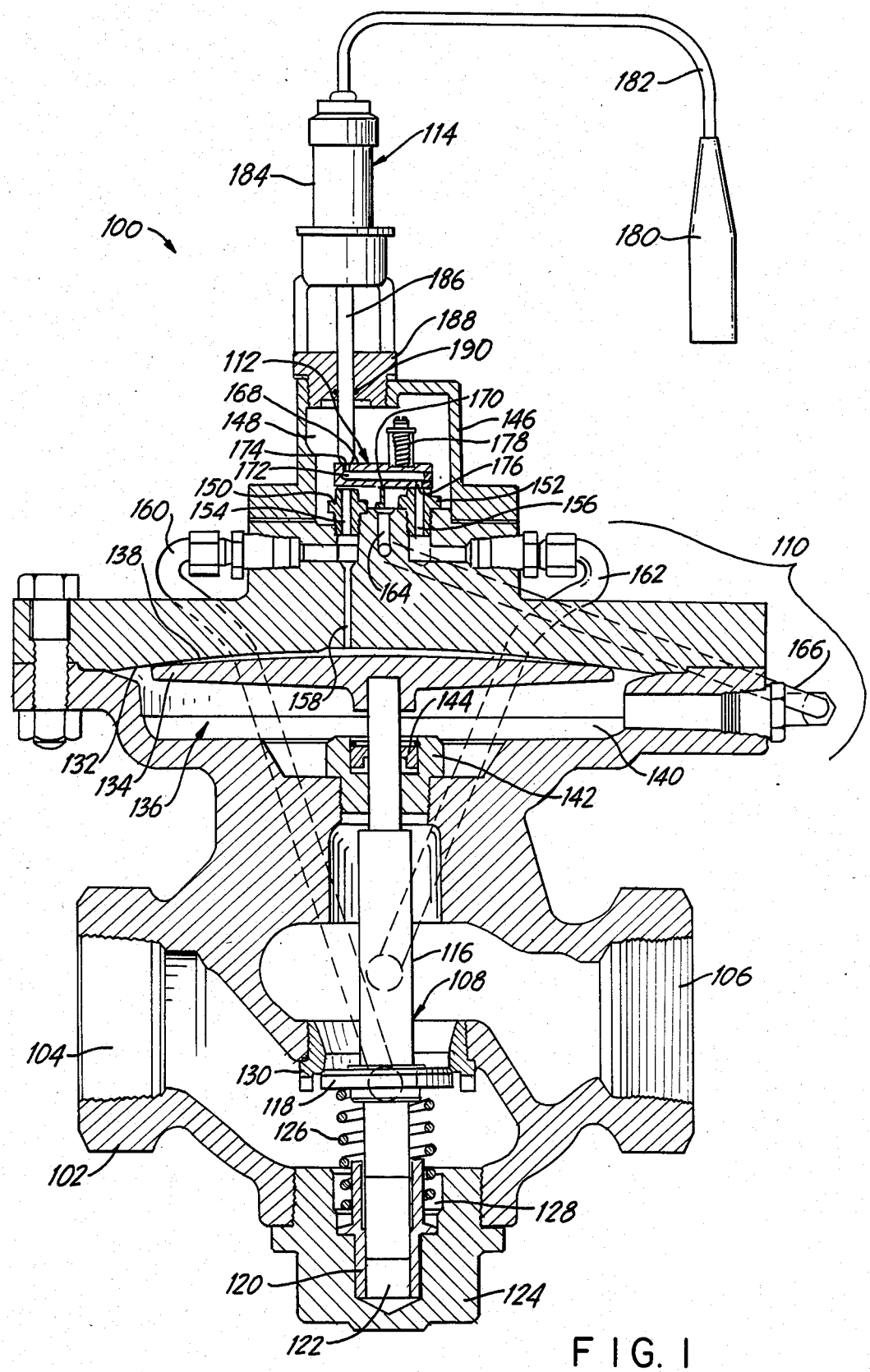
FIG. 1 is a cross-sectional view of a regulating valve adapted for use in a cooling operation and provided with a lever having a channel extending therethrough to provide a fail-safe action in the event of failure of the thermal element.

Referring to the drawings, wherein like reference numerals represent like elements, there is shown in FIG. 1 a cross-sectional view of a regulating valve suitable for use in a cooling mode and generally designated by reference numeral 100. The valve 100 is constructed from an overall body 102 having a body inlet 104 and a body outlet 106. Regulating means 108 is arranged centrally within the body 102 and operatively connected to control means 110 which is arranged in an upper portion of the body. The fail-safe action of the valve 100 is achieved by adjusting means 112 which is responsive to the operation of a sensing element 114. The specific construction and arrangement of each of the foregoing components will now be described in greater detail.

The regulating means 108 is constructed from a longitudinally extending shaft 116 which is movable along the longitudinal axis of the valve 100 in a direction substantially transverse to the direction of fluid flow through the body 102. A ring-shaped seat 118 is secured about the lower portion of the shaft 116 within that portion of the body 102 which is in fluid communication with the body inlet 104. The lower end of the shaft 116 is slidingly received within a bushing 120 secured within an opening 122 provided within a cap 124. A coiled spring 126 is provided within an annular-shaped recess 128 formed between the bushing 120 and the cap 124. The spring 116 is arranged circumscribing the lower portion of the shaft 116 and engaged by the seat 18 for biasing the regulating means 108 in an upward direction away from the cap 124. The upward movement of the regulating means 108 by the spring 126 causes sealing engagement of the seal 118 with a corresponding ring-shaped seat ring 130 arranged within the body 102 between the body inlet 104 and the body outlet 106. As such, the engagement of the seat 118 with the seat ring 130 by movement of the shaft 116, in reponse to the spring 126, closes the valve 100 and prevents fluid flow through the body 102.

The control means 110 is constructed from a diaphragm 132 overlying a diaphragm disk 134 which divides a chamber 136 into an upper portion 138 and a lower portion 140. The central portion of the body 102 contains a guide 142 having packing material 144 which slidingly receives the upper portion of the shaft 116 which in turn is attached to the diaphragm disk 134. As a result of the foregoing construction, movement of the diaphragm 132 and diaphragm disk 134 is effective to cause longitudinal movement of the shaft 116 to affect engagement and disengagement of the seat 118 with the seat ring 130 for controlling the flow of a fluid between the body inlet 104 and body outlet 106.

A bonnet 146 is provided overlying the upper portion of the body 102 to define a chamber 148. Contained within the chamber 148 is a further portion of the control means 110 including a first nozzle 150 and a second nozzle 152 having respective openings 154, 156 extending therethrough. Each of the openings 154, 156 are arranged in fluid communication with the chamber 148 defined by the bonnet 146. The opening 154 of the first nozzle 150 is further arranged in fluid communication with the upper portion 138 of the chamber 136 by means of a first conduit 158. The opening 154, as well as the first conduit 158, are also arranged in fluid communication with the body inlet 104 by means of a tube 160 arranged in fluid communication therebetween. The opening 156 of the second nozzle 152, in addition to being in fluid communication with the chamber 148, is arranged in fluid communication with the body oulet 106 by means of a tube 162 arranged in fluid communication therebetween. A conduit 164 is provided between the nozzles 150, 152 in fluid communication with the chamber 148. A tube 166 is connected between the conduit 164 and the lower portion 140 of the chamber 136 to provide fluid communication therebetween. As a result of the foregoing construction, fluid from the body inlet 104 is communicated to the chamber 148 via tube 160 and nozzle 150, to the upper portion 138 of the chamber 136 via conduit 158, to the lower portion 140 of the chamber via conduit 164 and tube 166, and to the body outlet 106 via nozzle 152 and tube 162.

The adjusting means 112 is constructed from a lever 168 pivotally mounted about pivot point 170 within the chamber 148 overlying the openings 154, 156 of the nozzles 150, 152. The lever 168 includes a longitudinally extending channel 172 having a lever inlet 174 and a lever outlet 176. A spring 178 is positioned within the chamber 148 to normally bias the lever in a clockwise direction to uncover the opening 154 of the nozzle 150 while closing the opening 156 of the nozzle 152.

The sensing means 114 comprises a conventional fluid filled thermal element which is available from Leslie Company of Parsippany, N.J. Briefly, the sensing means 114, i.e., thermal element, is constructed from a thermal sensor 180 and sealed tube 182 which contain a working fluid. The tube 182 is attached in fluid communication with a bellows assembly 184 which includes a bellows (not shown) and a spring (not shown) coupled to a longitudinally extending shaft 186. The bellows assembly 184 is attached to the upper portion of the bonnet 146 by means of a guide 188 containing packing material 190. The shaft 186 is adapted for reciprocal movement along its longitudinal axis in response to the bellows assembly 184. Under normal operating conditions, the terminal end of the shaft 186 engages the lever inlet 174 of the lever 168 to effect closure thereof.

The detailed construction of the valve 100 having been described, the reader's attention is now directed to the operation of the valve and its providing a fail-safe action. The thermal sensor 180 is positioned in the jacket of, for example, an engine or compressor containing cooling water or brine to prevent overheating. When the temperature sensed is within the desired range, the shaft 186 of the bellows assembly 184 is retracted such that the lever 168 is pivoted clockwise by the spring 178 to open the opening 154 of the nozzle 150 while closing the opening 156 of the nozzle 152. In turn, the lever inlet 174 of the lever 168 is maintained closed by the terminal end of the shaft 186 when the sensing means 114, i.e., thermal element, is operating properly in a non-failure mode. Under these conditions, fluid from the body inlet 104 flows through tube 160 into the chamber 148 via nozzle 150 and to the upper portion 138 of the chamber 136 via conduit 158. In turn, the fluid within the chamber 148 flows through conduit 164 into the lower portion 140 of the chamber 136 via tube 166. As the fluid pressure within the upper portion 138 and lower portion 140 of the chamber 136, i.e., above and below the diaphragm 132 and diaphragm disk 134, is substantially equal, the control means 110 is dynamically balanced. As such, the seat 118 engages the seat ring 130 by upward longitudinal movement of the shaft 116 caused by the upward force exerted by the spring 126. Fluid from the body inlet 104 is thereby prevented from flowing through the body 102 to the body outlet 106.

As the temperature of the cooling water or brine increases, such temperature increase is sensed by the thermal sensor 180 causing expansion of the contained fluid. In turn, the bellows assembly 184 causes the extension of the shaft 186 which causes pivoting of the lever 168 in a counterclockwise direction. As the lever 168 pivots in this direction, the opening 156 of the nozzle 152 begins to open, while the opening 154 of the nozzle 150 begins to close, thus producing a throttling effect. As the opening 156 of the nozzle 152 is uncovered, fluid pressure within the lower portion 140 of the chamber 136 is dissipated as a result of the fluid communication established between the lower portion and the body outlet 106 via tube 166, conduit 164, nozzle 152, and tube 162. In turn, fluid pressure in the chamber 148, which supplies fluid pressure to the lower portion 140 of the chamber 136 is also reduced due to the closing of the opening 154 of the nozzle 150 by the lever 168. However, full fluid pressure of the fluid from the body inlet 104 is maintained within the upper portion 138 of the chamber 136 irrespective of the position of the lever 168.

As the pressure of the fluid in the upper portion 138 is greater than the pressure of the residual fluid within the lower portion 140, the regulating means 108 is urged downward by means of the diaphragm disk 134 to effect a variable opening between the seat 118 and seat ring 130, thereby regulating the flow of fluid through the body 102 between the body inlet 104 and body outlet 106. The flow of fluid through the body 104 is therefore directly related to the pressure differential of fluid within the upper portion 138 and lower portion 140 of the chamber 136. From the foregoing description, it will be appreciated that the valve 100 controls the flow of fluid through the body 104 in response to the temperature sensed by the sensing means 114.

As previously explained, failure of the sensing means 114, i.e., thermal element, is the equivalent of the thermal sensor 180 detecting a very low fluid temperature, which would therefore cause the regulating means 108 to close the gap formed between the seat 118 and seat ring 130 to prevent fluid flow through the body 102. Under such circumstances, the valve 100, in the absence of the present invention, would be incapable of preventing potentially irreparable damage to an engine or compressor caused by overheating and whose cooling is being controlled by the valve. In this regard, upon failure of the sensing means 114, the bellows assembly 184 retracts shaft 186 so as to uncover the lever inlet 174 within the lever 168. The lever 168 is pivoted clockwise by spring 178 to close nozzle 152 while opening nozzle 150. Fluid within chamber 148 received from the body inlet 104, now flows through the lever inlet 174 and channel 172, and exits through the lever outlet 176 into the opening 156 of the nozzle 152. Fluid pressure within chamber 148 is therefore vented to the body outlet 106 via tube 162. This venting prevents fluid pressure from being established within the lower portion 140 of the chamber 136 via its fluid communication to the chamber 148 by means of the conduit 164 and tube 166.

As the fluid within the upper portion 138 of the chamber 136 corresponds generally to that of the fluid pressure within the body inlet 104, the positive pressure differential across the diaphragm 132 causes downward movement of the regulating means 108 so as to disengage the seat 118 from the seat ring 130, thereby allowing fluid flow from the body inlet 104 to the body outlet 106. From the foregoing description, the valve 100 provides a fail-safe action which, upon failure of the sensing means 114, i.e., thermal element, results in the supply of cooling water or brine to the jacket of the engine or compressor being cooled.

Figure 2:
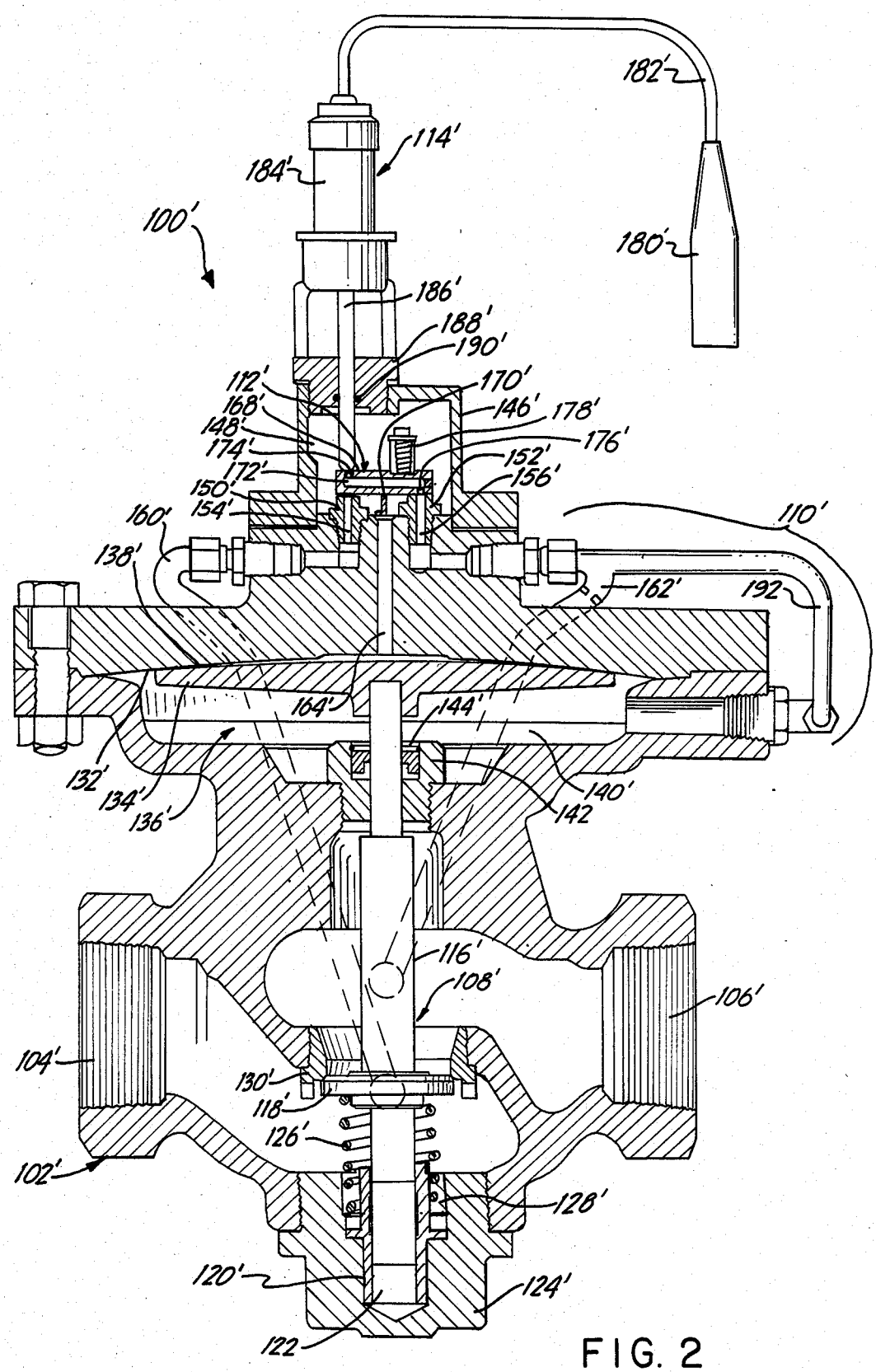
FIG. 2 is a cross-section view of a regulating valve adapted for use in a heating operation and provided with a lever having a channel and extending therethrough to provide a fail-safe action in the event of failure of the thermal element.

Although the invention herein has been described with reference to cooling, this invention is equally applicable for heating. An embodiment of the present invention which is specifically adapted for heating, while also providing a fail-safe action, is disclosed in FIG. 2. As shown in FIG. 2, there is disclosed a regulating valve 100' adapted for supplying a heating medium such as oil or steam to the jacket of, for example, heat transfer equipment, such as reaction vessels and the like. As the basic construction of the regulating valve 100' adapted for heating is substantially similar to that of the regulating valve 100 adapted for cooling, like elements have been designated by like numerals. For the purpose of brevity, only the constructional and functional differences between the regulating valve 100, as shown in FIG. 1, and the regulating valve 100', as shown in FIG. 2, will be described, all other aspects being substantially identical. Referring to the central portion of the valve 100', tube 160' from the body inlet 104' communicates directly to the chamber 148' via the opening 154' of the nozzle 150'. Conduit 164' provides direct fluid communication between the chamber 148' and the upper portion 138' of the chamber 136'. The opening 156' of the nozzle 152' provides direct fluid communication between the chamber 148' and the body outlet 106' via tube 162' and direct fluid communication to the lower portion 140' of the chamber 136' via tube 192.

The theory of operation of the valve 100' adapted for use in a heating mode is the same as that of the valve 100 adapted for use in a cooling mode. More specifically, when the temperature sensed by the thermal sensor 180' is below the desired range, the bellows assembly 184' is operative to retract shaft 186'. As such, the lever 168' is pivoted clockwise by the spring 178' to close the opening 156' of the nozzle 152' and to simultaneously open the opening 154' of the nozzle 150'. However, as previously noted, the lever inlet 174' is continuously maintained closed by engagement with the terminal end of the shaft 186' as long as the sensing means 114, i.e., thermal element, is functioning in its normal operating mode, that is, absence of failure. Hot fluid, e.g., oil or steam, from the inlet body 104' is supplied to the chamber 148' within the bonnet 146' via tube 160' and nozzle 150'. In turn, the hot fluid within the chamber 148' is supplied to the upper portion 138' of the chamber 136', while the lower portion 140' is vented to the body outlet 106' via tubes 162', 192. Hot fluid from the chamber 148' is prevented from flowing into the lower portion 140' by the lever 168' closing the opening 156' of the nozzle 152'. As there is now a positive pressure differential across the diaphragm 132', the higher pressure in the upper portion 138' of the chamber 136' urges the regulating means 108' downward to separate the seat 118' from the seat ring 130', thereby allowing fluid flow through the body 102' from the body inlet 104' to the body outlet 106'.

By controlling the extent of the opening and closing of the nozzles 150', 152' by the pivoting of the lever 168' by means of shaft 186' via expansion and contraction of the bellows assembly 184', the flow of heating fluid is regulated through the body 102' by varying the spacing through seat 118' and seat ring 130'. Upon the thermal sensor 180' sensing a fluid temperature within or greater than the desired range, the bellows assembly 184' functions to extend the shaft 186' to pivot the lever 168' in a counterclockwise direction, thereby closing the opening 154' of the nozzle 150'. As such, heating fluid from the body inlet 104' is prevented from flowing into the chamber 148' and therefore the upper portion 138' and lower portion 140' of the chamber 136'. As the pressure of any contained residual fluid within the upper portion 138' and lower portion 140' is now substantially equal, the regulating means 108' is urged upwardly by means of spring 126' to engage the seat ring 130' by the seat 118', thereby preventing fluid flow through the body 102'. It should now be understood that by pivoting the lever 168' in response to the expansion and contraction of the bellows assembly 184', the valve 100' is operative to regulate the flow of heating fluid through the body 102' from the body inlet 104' to the body outlet 106'.

In the event of failure of the sensing means 114', i.e., thermal element, the bellows assembly 184' retracts the shaft 186' such that the lever inlet 174' is uncovered while the lever 168 pivots in a clockwise direction uncovering the opening 154' of the nozzle 150' and closing opening 156' of nozzle 152'. Hot fluid from the body inlet 104' flows into the chamber 148' via tube 160' and nozzle 150'. The fluid within the chamber 148' in turn flows into the upper portion 138' of the chamber 136' via conduit 164' and into the lower portion 140' via channel 172' within the lever 168', nozzle 152' and tube 192. By supplying fluid into the upper portion 138' and lower portion 140' from the body inlet 104', the pressure differential across the diaphragm 132' is substantially zero, i.e., dynamically balanced, thereby enabling the regulating means 108' to be urged upward by the spring 126' to cause engagement of the seat 118' with the seat ring 130' to prevent any fluid flow through the body 104'. Thus, in accordance with the present invention, the foregoing construction and operation of the valve 100' provides a fail-safe action to protect the heat transfer equipment from being overheated in the event of failure of the sensing means 114', i.e., thermal element.

As thus far described, the regulating valves 100, 100' of the present invention, upon failure of the sensing means 114, 114', i.e., thermal element, opens when supplying a cooling medium and closes when supplying a heating medium. This mode of operating of the regulating valves 100, 100' provides a fail-safe type action which is reliable in use and not susceptible to being damaged or broken under adverse operating conditions. Although the invention herein has been described with reference to particular embodiments, it is to be understood that these embodiments are merely illustrative of the principles and application of the present invention. It is therefore to be understood that numerous modifications may be made in the illustrative embodiments and that other arrangements may be devised without departing from the spirit and scope of the present invention as defined by the appended claims.

What is claimed is:

1. A valve for controlling the flow of a fluid in response to a sensed condition, said valve comprising a body having a body inlet and a body outlet through which a fluid to be regulated flows, regulating means within said body for regulating the flow of said fluid between a first and a second state, sensing means for sensing a condition to be controlled by regulating the flow of said fluid between said states, control means for controlling said regulating means in response to said sensing means, and adjusting means for adjusting said control means such that said fluid is maintained by said regulating means at one of said states upon said sensing means becoming inoperative, said adjusting means comprising a lever including a channel extending therethrough and having a lever inlet and a lever outlet, said lever inlet closed by a portion of said sensing means when said sensing means is operative and opened when said sensing means is inoperative, said lever inlet in fluid communication with said body inlet and said lever outlet in fluid communication with said body outlet when said lever inlet is opened, whereby said fluid from said body inlet flows through said channel to said body outlet such that said regulating means in response to said control means permits the flow of said fluid through said body.

2. The valve of claim 1 wherein said first state permits the flow of at least a portion of said fluid through said body.

3. The valve of claim 2 wherein said second state prevents the flow of said fluid through said body.

4. The valve of claim 3 wherein said fluid is maintained by said adjusting means at said first state.

5. The valve of claim 3 wherein said fluid is maintained by said adjusting means at said second state.

6. The valve of claim 1 further including a chamber in fluid communication with said body inlet and said body outlet, said chamber containing said lever and a portion of said control means.

7. The valve of claim 6 wherein said control means includes a first nozzle provided in said chamber in fluid communication with said body inlet and a second nozzle provided in said chamber in fluid communication with said body outlet, said first and second nozzles each having an opening opened and closed by movement of said lever.

8. The valve of claim 7 further including biasing means for normally biasing said lever to close said opening of said second nozzle.

9. The valve of claim 7 wherein said control means includes a diaphragm having an upper portion in fluid communication with said chamber for receiving said fluid from said body inlet and a lower portion in fluid communication with said chamber for receiving said fluid from said body inlet, said diaphragm connected to said regulating means for controlling the flow of said fluid through said body in response to the movement of said diaphragm caused by the pressure differential of said fluid within said upper and lower portions.

10. The valve of claim 9 further including biasing means for biasing said regulating means into a position which prevents the flow of said fluid through said body when the pressure of said fluid in said upper portion is substantially equal to the pressure of said fluid in said lower portion, said pressure substantially equal when said lever closes said opening of said second nozzle while said portion of said sensing means closes said lever inlet.

11. The valve of claim 9 wherein said control means includes a first conduit providing fluid communication between said body inlet and said upper portion of said diaphragm, and a second conduit providing fluid communication between said chamber and said lower portion of said diaphragm.

12. A fail-safe valve for controlling the flow of a fluid in response to a sensed condition, said valve comprising a body having a body inlet and a body outlet through which a fluid to be regulated flows, regulating means within said body for regulating the flow of said fluid between a first and a second state, sensing means for sensing a condition to be controlled by regulating the flow of said fluid between said states, a diaphragm movable within a fluid containing chamber in response to a differential fluid pressure thereacross, said diaphragm for controlling said regulating means in response to the operation of said sensing means, and control means for controlling the movement of said diaphragm by changing the differential fluid pressure across said diaphragm such that said fluid being regulated is maintained by said regulating means at one of said states upon said sensing means becoming inoperative, said control means including a lever having a channel provided with a lever inlet and a lever outlet, said lever inlet closed by a portion of said sensing means when said sensing means is in an operative condition for regulating the flow of said fluid between said first state and said second state, said lever inlet opened when said sensing means is in an inoperative condition, whereby said lever inlet and said lever outlet are in fluid communication with one side of said diaphragm to produce a differential fluid pressure thereacross to cause the flow of said fluid to be maintained at one of said states.

13. The valve of claim 12 wherein said adjusting means comprises a lever including a channel having a lever inlet and lever outlet, said lever inlet closed by a portion of said sensing means when said sensing means is operative, said lever inlet opened when said sensing means is inoperative whereby said lever inlet is in fluid communication with said body inlet.

14. A valve for controlling the flow of a fluid in response to a sensed condition, said valve comprising a body having a body inlet and a body outlet through which a fluid to be regulated flows, regulating means within said body for regulating the flow of said fluid between a first and a second state, sensing means for sensing a condition to be controlled by regulating the flow of said fluid between said states, control means for controlling said regulating means in response to said sensing means, adjusting means for adjusting said control means such that said fluid is maintained by said regulating means at one of said states upon said sensing means becoming inoperative, said adjusting means comprising a lever including a channel having a lever inlet and lever outlet, said lever inlet closed by a portion of said sensing means when said sensing means is operative, said lever inlet opened when said sensing means is inoperative whereby said lever inlet is in fluid communication with said body inlet, and a chamber for containing said adjusting means and a portion of said control means, said chamber in fluid communication with said body inlet and said body outlet.

15. The valve of claim 14 wherein said control means comprises a diaphragm having an upper and a lower portion each in fluid communication with said chamber for receiving a fluid from said body inlet, said diaphragm connected to said regulating means for controlling the flow of said fluid through said body in response to the movement of said diaphragm caused by the pressure differential of said fluid within said upper and lower portions.

16. The valve of claim 15 wherein said lever outlet is in fluid communication with said lower portion of said diaphragm such that said fluid in said body inlet flows into said chamber, through said channel of said lever and into said lower portion when said sensing means becomes inoperative.

17. The valve of claim 16 further including a conduit providing fluid communication between said chamber and said upper portion of said diaphragm such that said fluid in said body inlet flows into said upper portion when said sensing means becomes inoperative whereby said regulating means, in response to the pressure of said fluid within said upper and lower portions being substantially equal, prevents the flow of said fluid through said body.

18. The valve of claim 16 wherein said control means further includes a first nozzle in fluid communication with said body inlet and a second nozzle in fluid communication with said lower side of said diaphragm and said body outlet, said first and second nozzles having an opening opened and closed by said lever.

19. The valve of claim 18 further including biasing means for normally biasing said lever to close said opening of said second nozzle.

20. A valve for controlling the flow of a fluid in response to a sensed condition, said valve comprising a body having a body inlet and a body outlet through which a fluid to be regulated flows, regulating means within said body for regulating the flow of said fluid between a first state permitting the flow of at least a portion of said fluid through said body and a second state preventing the flow of said fluid through said body, sensing means for sensing a condition to be controlled by regulating the flow of said fluid between said states, a chamber in fluid communication with said body inlet and said body outlet, a diaphragm for controlling said regulating means in response to said sensing means, said diaphragm having an upper and lower portion each in fluid communication with said chamber for receiving said fluid from said body inlet, said lower portion in further fluid communication with said body outlet, said diaphragm connected to said regulating means for controlling the flow of said fluid through said body in response to the movement of said diaphragm caused by the pressure differential of said fluid within said upper and lower portions, and a lever within said chamber including a channel extending therethrough and having a lever inlet and a lever outlet, said lever inlet closed by a portion of said sensing means when said sensing means is operative and opened when said sensing means is inoperative, said lever inlet in fluid communication with said body inlet and said lever outlet in fluid communication with at least said body outlet when said lever inlet is opened, said lever adjusting said control means such that said fluid is maintained by said regulating means at one of said states upon the opening of said lever inlet.

21. The valve of claim 20 wherein said control means includes a first nozzle provided in said chamber in fluid communication with said body inlet and a second nozzle provided in said chamber in fluid communication with said body outlet, said first and second nozzles each having an opening opened and closed by movement of said lever.

22. The lever of claim 20 wherein said control means includes a first conduit providing fluid communication between said body inlet and said upper portion of said diaphragm, and a second conduit providing fluid communication between said chamber and said lower portion of said diaphragm.

23. The valve of claim 20 wherein said lever outlet is in fluid communication with said lower portion of said diaphragm such that said fluid in said body inlet flows into said chamber, through said channel of said lever and into said lower portion when said sensing means becomes inoperative.

24. The valve of claim 23 further including a conduit providing fluid communication between said chamber and said upper portion of said diaphragm such that said fluid in said body inlet flows into said upper portion when said sensing means becomes inoperative whereby said regulating means, in response to the pressure of said fluid within said upper and lower portions being substantially equal, prevents the flow of said fluid through said body.

25. The valve of claim 24 further including a tube providing fluid communication between said chamber, said lower portion of said diaphragm and said body outlet.

* * * * *

UNITED STATES PATENT AND TRADEMARK OFFICE
CERTIFICATE OF CORRECTION

PATENT NO. : 4,648,553

DATED : March 10, 1987

INVENTOR(S) : Muller

It is certified that error appears in the above-identified patent and that said Letters Patent is hereby corrected as shown below:

Column 3, line 10, delete "lower" and insert --lever--.

Column 4, line 36, delete "oulet" and insert --outlet--.

Column 5, line 37, delete "increass" and insert -- increases --.

Column 11, line 24, delete "lever" and insert --valve--.

Signed and Sealed this

Eighteenth Day of August, 1987

*Attest:*

DONALD J. QUIGG

*Attesting Officer*  *Commissioner of Patents and Trademarks*